United States Patent [19]
Toda

[11] Patent Number: 5,886,452
[45] Date of Patent: Mar. 23, 1999

[54] SHEAR HORIZONTAL WAVE DEVICE FOR SENSING A TOUCH-POSITION

[76] Inventor: Kohji Toda, 1-49-18 Futaba, Yokosuka, 239, Japan

[21] Appl. No.: 904,533

[22] Filed: Aug. 1, 1997

[51] Int. Cl.[6] .................................................. H01L 41/08
[52] U.S. Cl. ................................. 310/313 R; 310/313 D; 178/18
[58] Field of Search ........................... 310/313 R, 313 B, 310/313 D; 367/118, 907; 333/193; 73/632; 178/18, 19

[56] References Cited

U.S. PATENT DOCUMENTS

| | | | |
|---|---|---|---|
| 5,679,998 | 10/1997 | Toda | 310/313 R |
| 5,723,934 | 3/1998 | Toda | 310/313 R |
| 5,767,604 | 6/1998 | Toda | 310/313 R |
| 5,767,608 | 6/1998 | Toda | 310/313 R |
| 5,771,206 | 6/1998 | Toda | 310/313 R |
| 5,838,088 | 11/1998 | Toda | 310/313 R |

*Primary Examiner*—Mark O. Budd

[57] ABSTRACT

An SH wave position-sensing device comprising two SH wave transducing units X and Y, a nonpiezoelectric plate and a signal controller. Each unit contains piezoelectric substrates $P_{T0}$, $P_{R0}$, $P_{Ti}$ (i=1, 2, ..., N) and $P_{Ri}$ (i=1, 2, ..., N), interdigital transducers $T_0$, $R_0$, $T_i$ (i=1, 2, ..., N) and $R_i$ (i=1, 2, ..., N). The interdigital transducers $T_0$, $R_0$, $T_i$ and $R_i$, are formed on an upper- or a lower end surface of the piezoelectric substrates $P_{T0}$, $P_{R0}$, $P_{Ti}$ and $P_{Ri}$, respectively. The lower end surface of each piezoelectric substrate is cemented on an upper end surface of the nonpiezoelectric plate. The finger direction of each interdigital transducer $R_i$ is slanting to that of each interdigital transducer $T_i$. When an electric signal is applied to the interdigital transducer $T_0$, an SH wave is excited in a bilayer zone $B_{T0}$ formed by the piezoelectric substrate $P_{T0}$ and the nonpiezoelectric plate, transmitted to a bilayer zone $B_{R0}$ formed by the piezoelectric substrate $P_{R0}$ and the nonpiezoelectric plate, and transduced to an electric signal with a phase $\theta_{base}$ and delivered at the interdigital transducer $R_0$.

12 Claims, 10 Drawing Sheets

SHEAR HORIZONTAL WAVE DEVICE FOR SENSING A TOUCH-POSITION

BACKGROUND OF THE INVENTION

1. Field of the Invention

The present invention relates to an SH wave (shear horizontal wave) device for sensing a touch-position on one end surface, having two SH wave transducing units, of a nonpiezoelectric plate.

2. Description of the Prior Art

An ultrasonic form of conventional touch panels has a nonpiezoelectric plate under acoustic vibration, which is decreased or disappeared when touching on the nonpiezoelectric plate. Conventional methods for exciting the acoustic vibration on a nonpiezoelectric plate generally include a wedge-shaped transducer with a bulk wave vibrator for vibrating a nonpiezoelectric plate indirectly, or a piezoelectric thin film transducer for vibrating a nonpiezoelectric plate directly. The wedge-shaped transducer is mainly used for a non-destructive evaluation by ultrasound under a comparative low frequency operation alone because of the difficulty on manufacturing accuracy of the wedge angle and so on. The piezoelectric thin film transducer consists of a nonpiezoelectric plate, a piezoelectric thin film mounted on the nonpiezoelectric plate and made from ZnO and others, and interdigital transducers exciting the acoustic vibration on the nonpiezoelectric plate. Because of various transmission characteristics of the interdigital transducers with various structures, the piezoelectric thin film transducer is used as a high frequency device, however has operation frequencies limited to the UHF and VHF bands, and has some problems on manufacturing and mass production. In addition, conventional-type transducers make use of decreasing or disappearance of output electric signal in accordance with decreasing or disappearance of an acoustic wave on the nonpiezoelectric plate by touching thereon, causing a high voltage operation with a high power consumption, and a large-scale circuit with a complicated structure.

Thus, it is difficult for conventional touch panels to realize a quick response-time, a low voltage operation and a low power consumption, an accurate detection of a minute touch-position, and a small-sized circuit with a simple structure. Moreover, there are some problems on manufacturing, mass production and operation frequencies.

SUMMARY OF THE INVENTION

An object of the present invention is to provide an SH wave position-sensing device capable of specifying a minute touch-position on one end surface of a nonpiezoelectric plate with a high sensitivity and a quick response time.

Another object of the present invention is to provide an SH wave position-sensing device excellent in manufacturing and mass-production.

A still other object of the present invention is to provide an SH wave position-sensing device operating under low power consumption with low voltage.

A still further object of the present invention is to provide an SH wave position-sensing device having a small-sized circuit with a simple structure which is very light in weight.

According to one aspect of the present invention there is provided an SH wave position-sensing device comprising two SH wave transducing units X and Y, a nonpiezoelectric plate having an upper- and a lower end surfaces, and a signal controller. Each SH wave transducing unit consists of piezoelectric substrates $P_{T0}$, $P_{R0}$, $P_{Ti}$ (i=1, 2, ..., N) and $P_{Ri}$ (i=1, 2, ..., N), interdigital transducers $T_0$, $R_0$, $T_i$ (i=1, 2, ..., N) and $R_i$ (i=1, 2, ..., N), an amplifier and a phase comparator. An output terminal of the interdigital transducer $R_0$ is connected with an input terminal of the phase comparator and an input terminal of each of the interdigital transducers $T_0$ and $T_i$, via the amplifier. An output terminal of each interdigital transducer $R_i$ is connected with an input terminal of the signal controller via the phase comparator. Each of the piezoelectric substrates $P_{T0}$, $P_{R0}$, $P_{Ti}$ and $P_{Ri}$, has an upper- and a lower end surfaces running perpendicular to the direction of the thickness d thereof. Each of the interdigital transducers $T_0$, $R_0$, $T_i$ and $R_i$, is formed on the upper- or the lower end surface of each of the piezoelectric substrates $P_{T0}$, $P_{R0}$, $P_{Ti}$ and $P_{Ri}$, respectively. The lower end surface of each piezoelectric substrate is cemented on the upper end surface of the nonpiezoelectric plate. The boundary surface of each piezoelectric substrate to the nonpiezoelectric plate is under electrically shorted condition. The interdigital transducer $R_0$ is placed such that the finger direction thereof runs parallel with that of the interdigital transducer $T_0$. Each interdigital transducer $R_i$ is placed such that the finger direction thereof is slanting to that of each interdigital transducer $T_i$ by an angle $\alpha$. Each of the interdigital transducers $T_0$, $R_0$ and $T_i$, has an interdigital periodicity P. An interdigital periodicity $P_N$ along the vertical direction to the finger direction of each interdigital transducer $R_i$ is equal to the product of the interdigital periodicity P and $\cos \alpha$, an overlap length $L_P$ along the finger direction of each interdigital transducer $R_i$ being equal to the product of an overlap length L of each interdigital transducer $T_i$ and $\sec \alpha$ as well as the product of the interdigital periodicity P and $\text{cosec } \alpha$. A part, adjacent to the piezoelectric substrate $P_{T0}$, of the nonpiezoelectric plate, and the piezoelectric substrate $P_{T0}$ form a bilayer zone $B_{T0}$. A part, adjacent to the piezoelectric substrate $P_{R0}$, of the nonpiezoelectric plate, and the piezoelectric substrate $P_{R0}$ form a bilayer zone $B_{R0}$, the remaining part, between the bilayer zones $B_{T0}$ and $B_{R0}$, of the nonpiezoelectric plate consisting of a monolayer zone. A part, adjacent to the piezoelectric substrate $P_{Ti}$, of the nonpiezoelectric plate, and the piezoelectric substrate $P_{Ti}$ form a bilayer zone $B_{Ti}$ (i=1, 2, ..., N). A part, adjacent to the piezoelectric substrate $P_{Ri}$, of the nonpiezoelectric plate, and the piezoelectric substrate $P_{Ri}$ form a bilayer zone $B_{Ri}$ (i=1, 2, ..., N), the remaining part, between the bilayer zones $B_{Ti}$ and $B_{Ri}$, of the nonpiezoelectric plate consisting of a monolayer zone.

When an electric signal with a frequency approximately corresponding to the interdigital periodicity P is applied to the interdigital transducer $T_0$, an SH wave of the zeroth mode and the higher order modes is excited in the bilayer zone $B_{T0}$, an SH wave having a displacement, of which direction is parallel to the end surfaces of each piezoelectric substrate. The SH wave having the wavelength approximately equal to the interdigital periodicity P is transmitted to the bilayer zone $B_{R0}$ through an upper end surface of the monolayer zone between the bilayer zones $B_{T0}$ and $B_{R0}$, and transduced to an electric signal with a phase $\theta_{base}$, the electric signal being delivered at the interdigital transducer $R_0$. When an electric signal with a frequency approximately corresponding to the interdigital periodicity P is applied to each interdigital transducer $T_i$, an SH wave of the zeroth mode and the higher order modes is excited in each bilayer zone $B_{Ti}$, and transmitted to each bilayer zone $B_{Ri}$ through an upper end surface of each monolayer zone between each bilayer zones $B_{Ti}$ and $B_{Ri}$. The SH wave having the wavelength approximately equal to the interdigital periodicity P is transduced to electric signals $E_j$ (j=x, ..., 2, 1, 0, -1, -2, ..., -x) with phases $\theta_j$ (j=x, ..., 2, 1, 0, -1, -2, ..., -x), respectively, at each interdigital transducer $R_i$, the phase velocity of the SH wave approximating to the average value between the shear wave velocity traveling on the nonpiezoelectric plate alone and that traveling on each piezoelectric substrate alone. The phases $\theta_j$ correspond to positions $F_j$ (j=x, ..., 2, 1, 0, -1, -2, ..., -x) on the upper end surface of the monolayer zone between the bilayer zones $B_{Ti}$ and $B_{Ri}$. The total phase $\Sigma\theta_j$ made by the phases $\theta_j$ is zero, the total electric signal $\Sigma E_j$ made by the electric signals $E_j$ being zero and not able to be detected at each interdigital transducer $R_i$. The interdigital transducers $T_i$ and $R_i$ form propagation lanes $D_i$ (i=1, 2, ..., N) of the SH wave on the upper end surface of the monolayer zone between the bilayer zones $B_{Ti}$ and $B_{Ri}$, respectively. Each propagation lane $D_i$ consists of minute propagation lanes $Z_j$ (j=x, ..., 2, 1, 0, -1, -2, ... -x) corresponding to the positions $F_j$ and the phases $\theta_j$, a propagation lane $Z_0$ existing on the line not only vertical to the finger direction of each interdigital transducer $T_i$ but also dividing the overlap length L into two halves. If touching with a finger or others on a position $F_j$, an electric signal $E_{-j}$ with a phase $\theta_{-j}$ is delivered at each interdigital transducer $R_i$. The phase comparator detects a difference between the phases $\theta_{-j}$ and $\theta_{base}$. The signal controller senses a touched position $F_j$ by finding one, delivering the electric signal $E_{-j}$, of the interdigital transducers $R_i$, and by evaluating the difference between the phases $\theta_{-j}$ and $\theta_{base}$.

According to another aspect of the present invention there is provided an SH wave position-sensing device comprising two SH wave transducing units X and Y, the nonpiezoelectric plate and the signal controller. Each SH wave transducing unit consists of the piezoelectric substrates $P_{Ti}$ and $P_{Ri}$, the interdigital transducers $T_i$ and $R_i$, and an amplifier. Output terminals of the interdigital transducers $R_i$ are connected with each other at an output point, the output point being connected with an input terminal of the signal controller and input terminals of the interdigital transducers $T_i$ via the amplifier. An interdigital periodicity $P_N$ along the vertical direction to the finger direction of each interdigital transducer $R_i$ is equal to the product of the interdigital periodicity P and cos α, an overlap length $L_P$ along the finger direction of each interdigital transducer $R_i$ being equal to the product of an overlap length L of each interdigital transducer $T_i$ and sec α as well as the product of N times (N=1, 2, ..., N) the interdigital periodicity P and cosec α. When an electric signal is applied to each interdigital transducer $T_i$, an SH wave is excited in each bilayer zone $B_{Ti}$, and transmitted to each bilayer zone $B_{Ri}$ through the upper end surface of each monolayer zone between each bilayer zones $B_{Ti}$ and $B_{Ri}$. The SH wave is transduced to electric signals $E_j$ with frequencies $f_j$ (j=x, ..., 2, 1, 0, -1, -2, ..., -x), respectively, the frequencies $f_j$ corresponding to the positions $F_j$, the total electric signal $\Sigma E_j$ made by the electric signals $E_j$ being zero and not able to be detected at each interdigital transducer $R_i$. If touching on a position $F_j$, an electric signal $E_{-j}$ with a frequency $f_{-j}$ is delivered at each interdigital transducer $R_i$. The signal controller senses a touched position $F_j$ by finding one, delivering the electric signal $E_{-j}$, of the interdigital transducers $R_i$, and by evaluating the frequency $f_{-j}$.

According to another aspect of the present invention there is provided two SH wave transducing unit, each thereof further comprising a switch connected with input terminals of the interdigital transducers $T_i$. The switch supplies the interdigital transducers $T_i$ with the electric signal having a frequency approximately corresponding to the interdigital periodicity P with a fixed period in turn. Output terminals of the interdigital transducers $R_i$ are connected with each other at an output point. Signal controller senses a touched position $F_j$ by finding one, supplied with the electric signal just when the electric signal $E_{-j}$ is detected at the output point, of the interdigital transducers $T_i$, and by evaluating the difference between the phases $\theta_{-j}$ and $\theta_{base}$ or by evaluating the frequency $f_{-j}$.

According to another aspect of the present invention there is provided propagation lanes $D_i$, two neighbors thereof being closed or partially overlapping each other.

According to another aspect of the present invention there is provided propagation lanes $D_i$, of the SH wave transducing unit X, vertical to those of the SH wave transducing unit Y.

According to other aspect of the present invention there is provided a nonpiezoelectric plate, the thickness thereof being larger than the thickness d. The nonpiezoelectric plate is made of a material such that the shear wave velocity traveling on the nonpiezoelectric plate alone is higher than that traveling on each piezoelectric substrate alone.

According to a further aspect of the present invention there is provided piezoelectric substrates $P_{T0}$, $P_{R0}$, $P_{Ti}$ and $P_{Ri}$, made of a piezoelectric ceramic, respectively.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
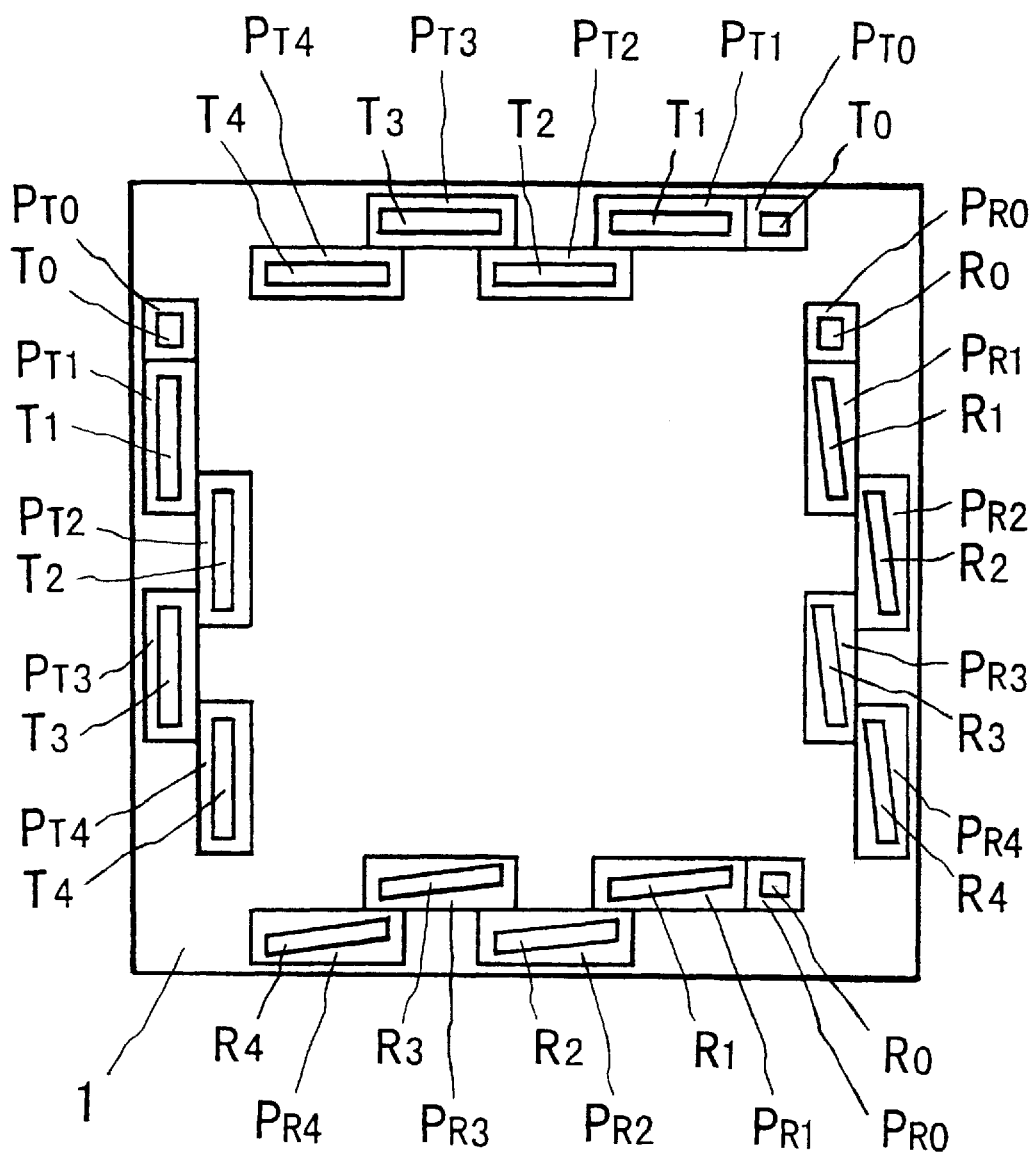
FIG. 1 shows a top plan view of an SH wave position-sensing device according to a first embodiment of the present invention.

FIG. 1 shows a top plan view of an SH wave position-sensing device according to a first embodiment of the present invention. The SH wave position-sensing device comprises nonpiezoelectric plate 1 having an upper- and a lower end surfaces running perpendicular to the thickness direction thereof, SH wave transducing units X and Y, and signal controller 4. Each SH wave transducing unit comprises piezoelectric substrates $P_{T0}$, $P_{T1}$, $P_{T2}$, $P_{T3}$, $P_{T4}$, $P_{R0}$, $P_{R1}$, $P_{R2}$, $P_{R3}$ and $P_{R4}$, input interdigital transducers $T_0$, $T_1$, $T_2$, $T_3$ and $T_4$, output interdigital transducers $R_0$, $R_1$, $R_2$, $R_3$ and $R_4$, amplifier 2, phase comparator 3, and switch 5. FIG. 1 shows only nonpiezoelectric plate 1, all the piezoelectric substrates and all the interdigital transducers made from aluminium thin film. Each piezoelectric substrate, of which material is piezoelectric ceramic, has an upper- and a lower end surfaces running perpendicular to the direction of the thickness d thereof. Interdigital transducers $T_0$, $T_1$, $T_2$, $T_3$, $T_4$, $R_0$, $R_1$, $R_2$, $R_3$ and $R_4$, are cemented on the upper end surfaces of piezoelectric substrates $P_{T0}$, $P_{T1}$, $P_{T2}$, $P_{T3}$, $P_{T4}$, $P_{R0}$, $P_{R1}$, $P_{R2}$, $P_{R3}$ and $P_{R4}$, respectively. The lower end surfaces of all the piezoelectric substrates are cemented through an epoxy resin on the lower end surface of nonpiezoelectric plate 1, of which material is glass or polymer such as acrylate resin, teflon and plastic material. The boundary surface of each piezoelectric substrate to nonpiezoelectric plate 1 is under electrically shorted condition. Interdigital transducer $R_0$ is opposed to interdigital transducer $T_0$ and placed such that the finger direction of interdigital transducer $R_0$ runs parallel with that of interdigital transducer $T_0$. Interdigital transducers $R_1$, $R_2$, $R_3$ and $R_4$, are opposed to interdigital transducers $T_1$, $T_2$, $T_3$ and $T_4$, respectively, and placed such that the finger direction of each of interdigital transducers $R_1$, $R_2$, $R_3$ and $R_4$, is not parallel to that of each of interdigital transducers $T_1$, $T_2$, $T_3$ and $T_4$. The polarization axis of each piezoelectric substrate is parallel to the finger direction of interdigital transducers $T_0$, $T_1$, $T_2$, $T_3$, $T_4$ and $R_0$. Such a directionality of a popular substrate to an interdigital transducer makes it difficult to realize the size of the popular substrate larger. However, it is possible, in the present invention, to make the size of each piezoelectric substrate larger because each piezoelectric substrate is made from piezoelectric ceramic.

Figure 2:
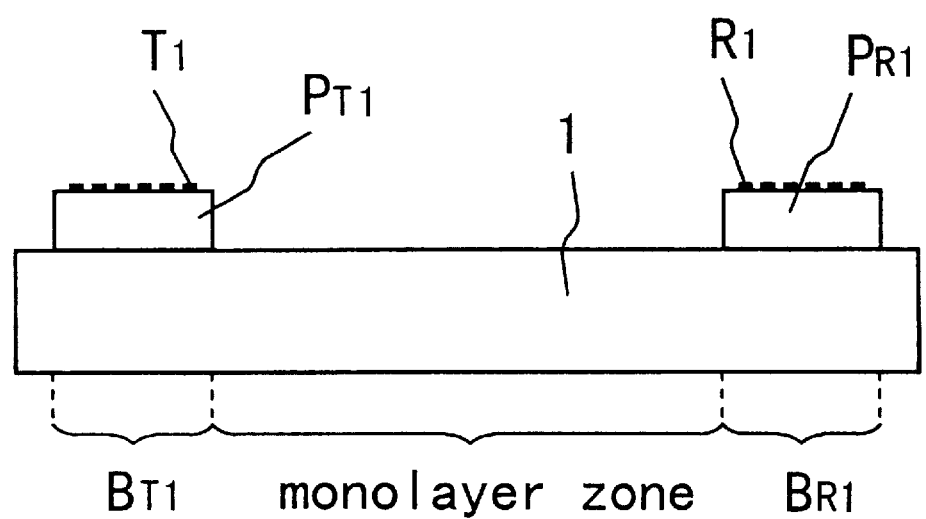
FIG. 2 shows a sectional view of the SH wave position-sensing device in FIG. 1.

FIG. 2 shows a sectional view of the SH wave position-sensing device in FIG. 1. FIG. 2 shows only interdigital transducers $T_1$, $R_1$, piezoelectric substrates $P_{T1}$ and $P_{R1}$, of SH wave transducing unit X or Y, and nonpiezoelectric plate 1. As mentioned above, interdigital transducers $T_0$, $T_1$, $T_2$, $T_3$, $T_4$, $R_0$, $R_1$, $R_2$, $R_3$ and $R_4$, are cemented on the upper end surfaces of piezoelectric substrates $P_{T0}$, $P_{T1}$, $P_{T2}$, $P_{T3}$, $P_{T4}$, $P_{R0}$, $P_{R1}$, $P_{R2}$, $P_{R3}$ and $P_{R4}$, respectively. However, interdigital transducers $T_0$, $T_1$, $T_2$, $T_3$, $T_4$, $R_0$, $R_1$, $R_2$, $R_3$ and $R_4$, can be cemented on the lower end surfaces of piezoelectric substrates $P_{T0}$, $P_{T1}$, $P_{T2}$, $P_{T3}$, $P_{T4}$, $P_{R0}$, $P_{R1}$, $P_{R2}$, $P_{R3}$ and $P_{R4}$, respectively. Interdigital transducers $T_1$, $T_2$, $T_3$ and $T_4$ have the same constructions, each thereof having three finger pairs with an overlap length L of 12 mm and an interdigital periodicity P of 290 $\mu$m. Interdigital transducers $T_0$ and $R_0$ have the same constructions, each thereof having three finger pairs with an overlap length of 2 mm and an interdigital periodicity P of 290 $\mu$m. Interdigital transducers $R_1$, $R_2$, $R_3$ and $R_4$ have the same constructions, each thereof having three finger pairs. Each piezoelectric substrate has a dimension of 0.2 mm in thickness. Nonpiezoelectric plate 1 has a dimension of 0.4 mm in thickness. A part, adjacent to piezoelectric substrate $P_{T0}$, of nonpiezoelectric plate 1, and piezoelectric substrate $P_{T0}$ form a bilayer zone $B_{T0}$. A part, adjacent to piezoelectric substrate $P_{R0}$, of nonpiezoelectric plate 1, and piezoelectric substrate $P_{R0}$ form a bilayer zone $B_{R0}$, the remaining part between the bilayer zones $B_{T0}$ and $B_{R0}$ consisting of a monolayer zone. A part, adjacent to piezoelectric substrate $P_{T1}$, $P_{T2}$, $P_{T3}$ or $P_{T4}$, of nonpiezo-electric plate 1, and piezoelectric substrate $P_{T1}$, $P_{T2}$, $P_{T3}$ or $P_{T4}$ form a bilayer zone $B_{T1}$, $B_{T2}$, $B_{T3}$ or $B_{T4}$, respectively. A part, adjacent to piezoelectric substrate $P_{R1}$, $P_{R2}$, $P_{R3}$ or $P_{R4}$, of nonpiezoelectric plate 1, and piezoelectric substrate $P_{R1}$, $P_{R2}$, $P_{R3}$ or $P_{R4}$ form a bilayer zone $B_{R1}$, $B_{R2}$, $B_{R3}$ or $B_{R4}$, respectively, the remaining part, between the bilayer zones $B_{T1}$ and $B_{R1}$, $B_{T2}$ and $B_{R2}$, $B_{T3}$ and $B_{R3}$, or $B_{T4}$ and $B_{R4}$, consisting of a monolayer zone.

Figure 3:
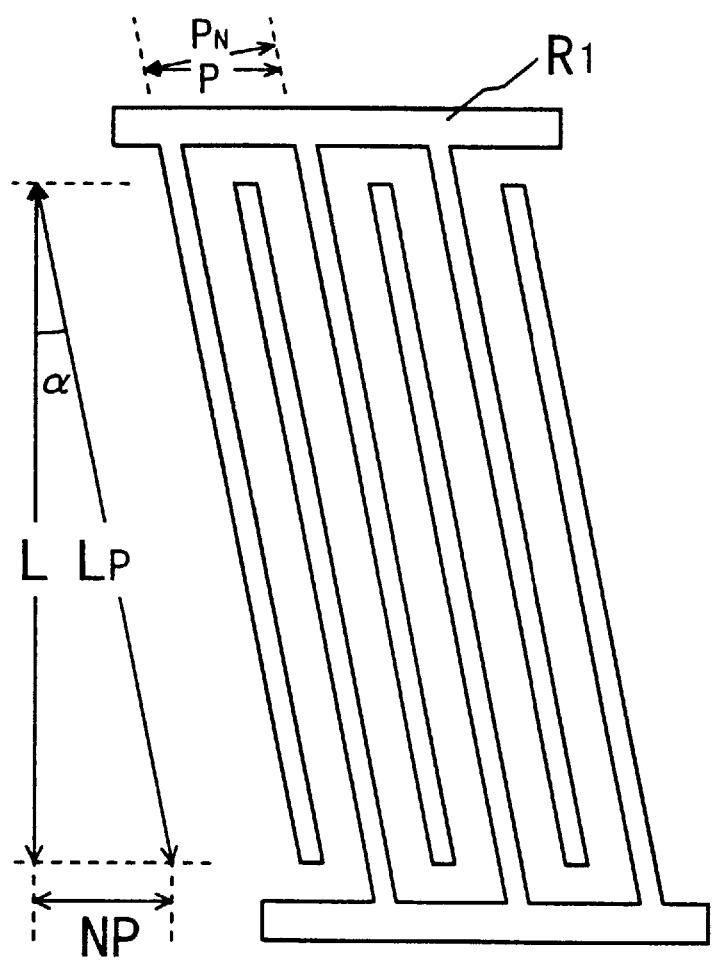
FIG. 3 shows a plan view of interdigital transducer $R_1$.

FIG. 3 shows a plan view of interdigital transducer $R_1$. Interdigital transducers $R_1$, $R_2$, $R_3$ and $R_4$, are placed such that the finger directions thereof are slanting to those of interdigital transducers $T_1$, $T_2$, $T_3$ and $T_4$ by an angle $\alpha$, respectively. An interdigital periodicity $P_N$ along the vertical direction to the finger direction of each of interdigital transducers $R_1$, $R_2$, $R_3$ and $R_4$, is equal to the product of the interdigital periodicity P and cos $\alpha$. An overlap length $L_P$ along the finger direction of each of interdigital transducers $R_1$, $R_2$, $R_3$ and $R_4$, is equal to the product of the overlap length L and sec $\alpha$ as well as the product of N times (N=1) the interdigital periodicity P and cosec $\alpha$, NP in FIG. 3 being equal to P.

Figure 4:
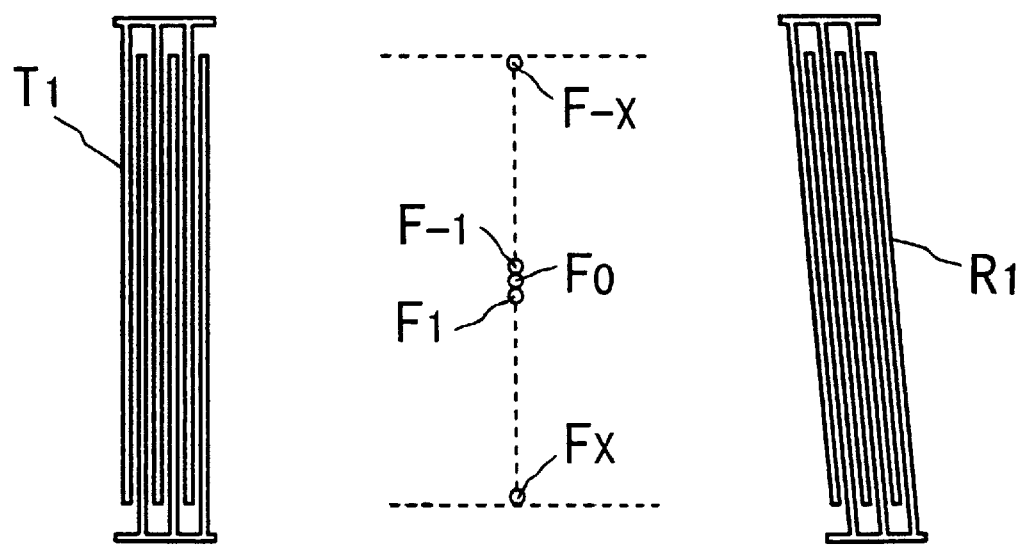
FIG. 4 shows a representation of relative situations of interdigital transducers $T_1$ and $R_1$.

FIG. 4 shows a representation of relative situations of interdigital transducers $T_1$ and $R_1$. In the SH wave position-sensing device in FIG. 1, it is possible to sense a touch with a finger or others on one of positions $F_j$ (j=x, ..., 2, 1, 0, −1, −2, ..., −x), along the finger direction of interdigital transducer $T_1$ and within the overlap length L thereof, on an upper end surface of the monolayer zone between the bilayer zones $B_{T1}$ and $B_{R1}$, in FIG. 2. The relative situations of interdigital transducers $T_2$ and $R_2$, $T_3$ and $R_3$, and $T_4$ and $T_4$, are all the same as those of interdigital transducers $T_1$ and $R_1$. Therefore, it is possible to sense a touch on one of the positions $F_j$ on the upper end surface of the monolayer zone between the bilayer zones $B_{T2}$ and $B_{R2}$, $B_{T3}$ and $B_{R3}$, or $B_{T4}$ and $B_{R4}$.

Figure 5:
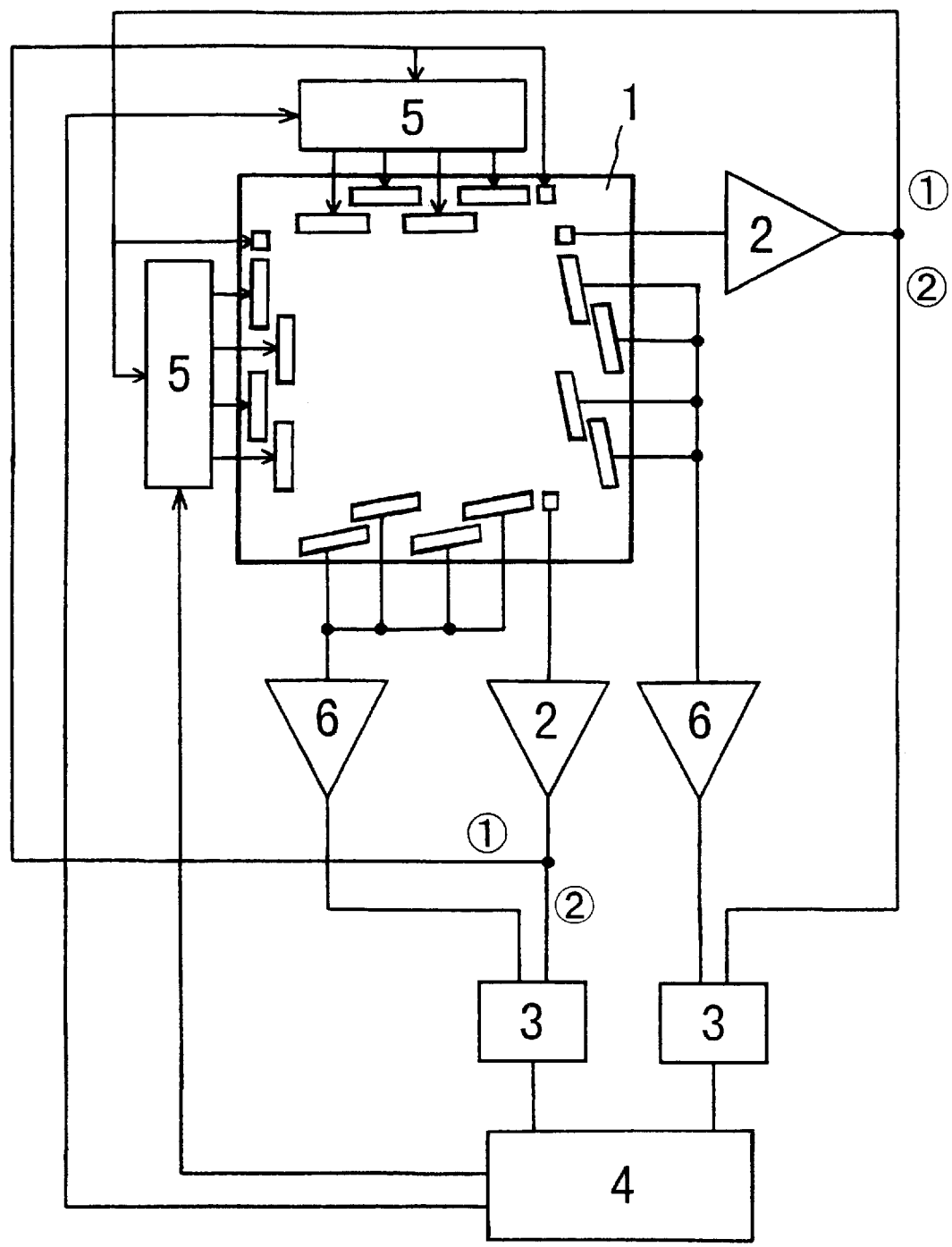
FIG. 5 shows a diagram of a driving circuit of the SH wave position-sensing device in FIG. 1.

FIG. 5 shows a diagram of a driving circuit of the SH wave position-sensing device in FIG. 1. Output terminals of interdigital transducers $R_1$, $R_2$, $R_3$ and $R_4$, are connected with each other at an output point. The output point is connected with an input terminal of phase comparator 3 via amplifier 6. An output terminal of interdigital transducer $R_0$ is connected with input terminals of phase comparator 3, interdigital transducer $T_0$ and switch 5, via amplifier 2. Input terminals of interdigital transducers $T_1$, $T_2$, $T_3$ and $T_4$, are connected with an output terminal of switch 5 supplying interdigital transducer $T_1$, $T_2$, $T_3$ or $T_4$ with an electric signal with a fixed period in turn.

In the driving circuit in FIG. 5, when an electric signal having a frequency approximately corresponding to the interdigital periodicity P is applied to interdigital transducer $T_0$, an SH wave of the zeroth mode and the higher order modes is excited in the bilayer zone $B_{T0}$. In this time, the SH wave having the wavelength approximately equal to the interdigital periodicity P can be excited effectively by employing interdigital transducer $T_0$ with only three finger pairs. The SH wave is transmitted, along the direction vertical to the finger direction of interdigital transducer $T_0$, to the bilayer zone $B_{R0}$ through the monolayer zone between the bilayer zones $B_{T0}$ and $B_{R0}$, because the polarization axis of piezoelectric substrates $P_{T0}$ and $P_{R0}$ is parallel to the finger direction of interdigital transducer $T_0$. The SH wave in the bilayer zone $B_{R0}$ is transduced to an electric signal with a phase $\theta_{base}$ by interdigital transducer $R_0$, the electric signal being delivered at interdigital transducer $R_0$ and amplified via amplifier 2. An amplified electric signal ① is applied to interdigital transducer $T_0$ and switch 5, again. The other amplified electric signal ② is applied to phase comparator 3. Thus, interdigital transducers $T_0$ and $R_0$ and amplifier 2 form an oscillator, causing not only a low voltage operation and low power consumption, but also a small-sized circuit with a simple structure. In addition, the SH wave position-sensing device is not under the influence of the surroundings, such as a change in temperature.

When an electric signal having a frequency approximately corresponding to the interdigital periodicity P is applied to interdigital transducer $T_1$, $T_2$, $T_3$ or $T_4$, in the SH wave position-sensing device in FIG. 1, via switch 5, an SH wave of the zeroth mode and the higher order modes is excited in the bilayer zone $B_{T1}$, $B_{T2}$, $B_{T3}$ or $B_{T4}$. In this time, the SH wave having the wavelength approximately equal to the interdigital periodicity P can be excited effectively by employing interdigital transducer $T_1$, $T_2$, $T_3$ or $T_4$, with only three finger pairs, respectively. The SH wave is transmitted, along the direction vertical to the finger direction of interdigital transducer $T_1$, $T_2$, $T_3$ or $T_4$, to the bilayer zone $B_{R1}$, $B_{R2}$, $B_{R3}$ or $B_{R4}$ through the monolayer zone between the bilayer zones $B_{T1}$ and $B_{R1}$, $B_{T2}$ and $B_{R2}$, $B_{T3}$ and $B_{R3}$, or $B_{T4}$ and $B_{R4}$, respectively, because the polarization axis of piezoelectric substrates $P_{T1}$, $P_{T2}$, $P_{T3}$, $P_{T4}$, $P_{R1}$, $P_{R2}$, $P_{R3}$ and $P_{R4}$, is parallel to the finger direction of interdigital transducers $T_0$, $T_1$, $T_2$, $T_3$ and $T_4$. If the phase velocity of the SH wave approximates to the average value between the shear wave velocity traveling on nonpiezoelectric plate 1 alone and that traveling on each piezoelectric substrate alone, the transducing efficiency from the electric signal to the SH wave is very large. The transducing efficiency from an electric signal to a mechanical vibration by the SH wave is higher than that by a surface acoustic wave or that by Lamb waves. Thus, it is possible to operate the SH wave position-sensing device under low power consumption and low voltage. The SH wave in the bilayer zone $B_{R1}$, $B_{R2}$, $B_{R3}$ or $B_{R4}$ is transduced to electric signals $E_j$ (j=x, ..., 2, 1, 0, -1, -2, ..., -x) with phases $\theta_j$ (j=x, ..., 2, 1, 0, -1, -2, ..., -x) by interdigital transducer $R_1$, $R_2$, $R_3$ or $R_4$, the phases $\theta_j$ corresponding to the positions $F_j$. The total phase $\Sigma\theta_j$ made by the phases $\theta_j$ is zero, the total electric signal $\Sigma E_j$ made by the electric signals $E_j$ being zero and not able to be detected at interdigital transducers $R_1$, $R_2$, $R_3$ and $R_4$.

In the SH wave position-sensing device in FIG. 1, a group of interdigital transducers $T_1$ and $R_1$, $T_2$ and $R_2$, $T_3$ and $R_3$, or $T_4$ and $R_4$ forms a propagation lane $D_1$, $D_2$, $D_3$ or $D_4$, of the SH wave on the upper end surface of the monolayer zone between the bilayer zones $B_{T1}$ and $B_{R1}$, $B_{T2}$ and $B_{R2}$, $B_{T3}$ and $B_{R3}$, or $B_{T4}$ and $B_{R4}$, respectively. Each propagation lane consists of minute propagation lanes $Z_j$ (j=x, ..., 2, 1, 0, -1, -2, ..., -x) corresponding to the positions $F_j$ and the phases $\theta_j$, a propagation lane $Z_0$ existing on the line not only vertical to the finger direction of interdigital transducer $T_1$, $T_2$, $T_3$ or $T_4$ but also dividing the overlap length L into two halves. If touching with a finger or others on the position $F_5$ corresponding to the minute propagation lane $Z_5$ of the propagation lane $D_3$, an electric signal $E_{-5}$ with a phase $\theta_{-5}$ is delivered from interdigital transducer $R_3$, the electric signal $E_{-5}$ being equal to a difference between the total electric signal $\Sigma E_j$ and the electric signal $E_5$ ($E_{-5}=\Sigma E_j-E_5$), the phase $\theta_{-5}$ being equal to a difference between the total phase $\Sigma\theta_j$ and the phase $\theta_5$ ($\theta_{-5}=\Sigma\theta_j-\theta_5$). If touching nowhere, the total electric signal $\Sigma E_j$ is, as mentioned above, zero and not able to be detected at interdigital transducers $R_1$, $R_2$, $R_3$ and $R_4$. However, according to touching on the position $F_5$ corresponding to the minute propagation lane $Z_5$ of the propagation lane $D_3$, only the SH wave on the minute propagation lane $Z_5$ of the propagation lane $D_3$ is disappeared and not transduced to the electric signal $E_5$ with the phase $\theta_5$. As a result, the electric signal $E_{-5}$ ($E_{-5}=\Sigma E_j-E_5$) with the phase $\theta_{-5}$ ($\theta_{-5}=\Sigma\theta_j-\theta_5$) is delivered from interdigital transducer $R_3$. Thus, it is possible for the SH wave position-sensing device to respond only to a touch on nonpiezoelectric plate 1. The electric signal $E_{-5}$ delivered from interdigital transducer $R_3$ is applied to amplifier 6 via the output point connecting the output terminals of interdigital transducers $R_1$, $R_2$, $R_3$ and $R_4$, and then to phase comparator 3 detecting a difference between the phases $\theta_{-5}$ and $\theta_{base}$ ($\theta_{base}-\theta_{-5}$). Signal controller 4, for the first time, clarifies that the touched position $F_5$ exists on the propagation lane $D_3$ by finding that interdigital transducer $T_3$ is supplied with the electric signal just when the electric signal $E_{-5}$ is detected at the output point connecting the output terminals of interdigital transducers $R_1$, $R_2$, $R_3$ and $R_4$. And then, signal controller 4 specifies the touched position $F_5$ out of the positions $F_j$ under evaluation of the phase difference ($\theta_{base}-\theta_{-5}$). In general, if touching on a position $F_j$ of a propagation lane $D_1$, $D_2$, $D_3$ or $D_4$, an electric signal $E_{-j}$ ($E_{-j}=\Sigma E_j-E_j$) with a phase $\theta_{-j}$ ($\theta_{-j}=\Sigma_j-\theta_j$) is delivered from interdigital transducer $R_1$, $R_2$, $R_3$ or $R_4$, respectively. Phase comparator 3 detects a phase difference ($\theta_{base}-\theta_{-j}$). Signal controller 4 senses the touched position $F_j$ by finding one, delivering the electric signal $E_{-j}$, of interdigital transducers $R_1$, $R_2$, $R_3$ and $R_4$, and by evaluating the phase difference ($\theta_{base}-\theta_{-j}$). Instead of finding one, delivering the electric signal $E_{-j}$, of interdigital transducers $R_1$, $R_2$, $R_3$ and $R_4$, signal controller 4 in the driving circuit in FIG. 5, finds one of interdigital transducers $T_1$, $T_2$, $T_3$ and $T_4$, the one being supplied with the electric signal via switch 5 just when the electric signal $E_{-j}$ is detected at the output point connecting the output terminals of interdigital transducers $R_1$, $R_2$, $R_3$ and $R_4$. The use of switch 5 causes a small-sized circuit with a simple structure which is very light in weight.

In the SH wave position-sensing device in FIG. 1, a touched position $F_j$ in SH wave transducing unit X and that in SH wave transducing unit Y are specified at the same time, causing a high sensitivity and a quick response-time. In addition, the propagation lanes $D_1$, $D_2$, $D_3$ and $D_4$, in SH wave transducing unit X and those in SH wave transducing unit Y are vertical to each other, causing a precise specification of a touch-position. Two neighbors of the propagation lanes $D_1$, $D_2$, $D_3$ and $D_4$, in SH wave transducing unit X or Y are closed or partially overlapping each other, causing no null touch-point on all the upper- and the lower end surfaces of nonpiezoelectric plate 1.

Figure 6:
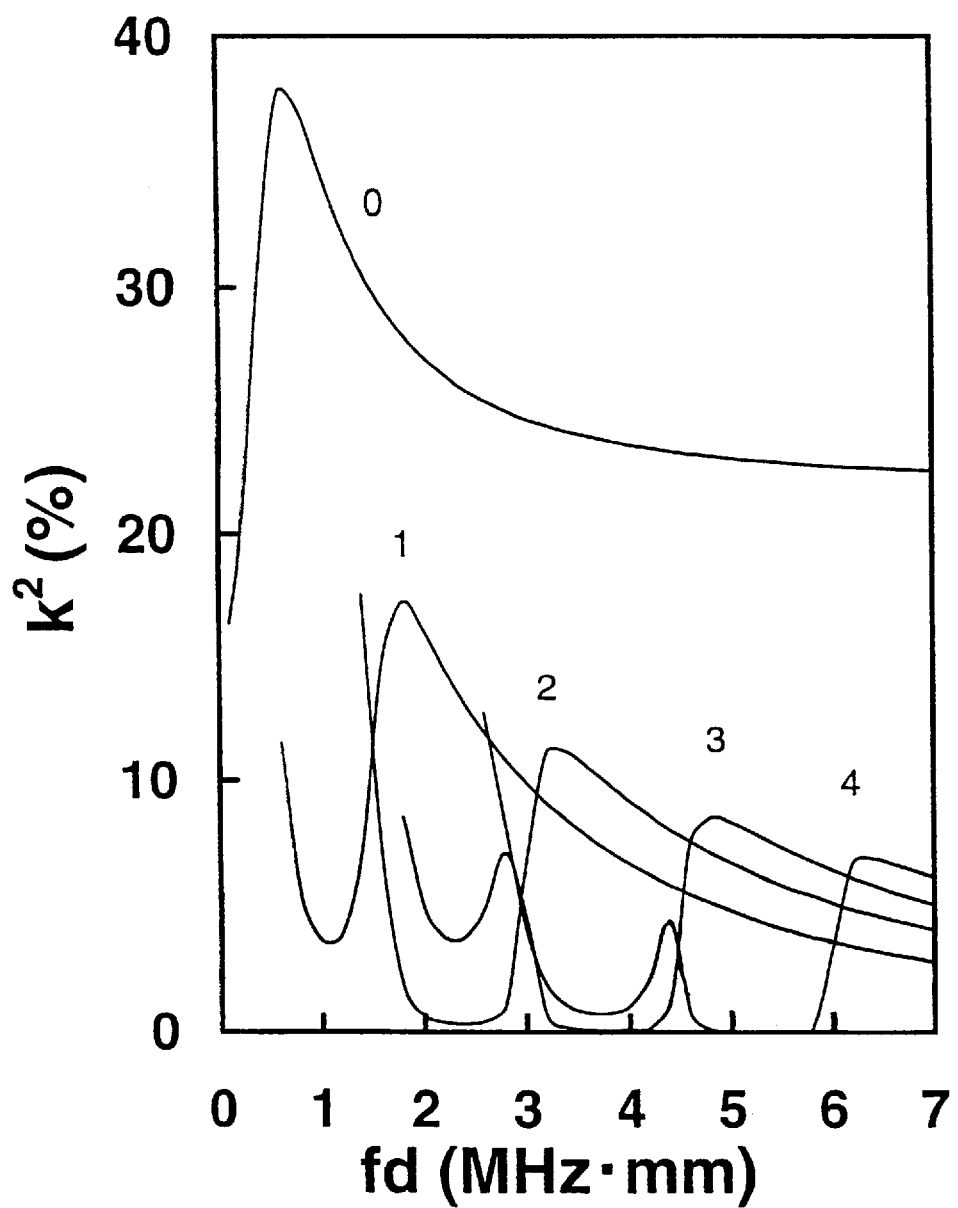
FIG. 6 shows a relationship between the $k^2$ value calculated from the difference between the phase velocity under electrically opened condition and that under electrically shorted condition of each piezoelectric substrate in FIG. 1, and the fd value.

FIG. 6 shows a relationship between the electromechanical coupling constant $k^2$ calculated from the difference between the phase velocity under electrically opened condition and that under electrically shorted condition of each piezoelectric substrate in FIG. 1, and the product fd of the frequency f of the SH wave and the thickness d of each piezoelectric substrate. In FIG. 6, nonpiezoelectric plate 1 is made from a glass having a shear wave velocity of 4203.4 m/s traveling on the glass alone. Each piezoelectric substrate has a shear wave velocity of 2448.8 m/s traveling thereon alone. It is clear that the zeroth mode SH wave and the higher order mode SH waves have large $k^2$ values. An electric energy applied to each of interdigital transducers $T_0$, $T_1$, $T_2$, $T_3$ and $T_4$, is most effectively transduced, for example, to the zeroth mode SH wave when the fd value is approximately 0.6 MHz·mm, then the $k^2$ value is approximately 33.8% being the maximum value. The $k^2$ value of 33.8% is worthy in comparison that a crystallized $LiNbO_3$ used as a popular piezoelectric substrate for a surface acoustic wave has the $k^2$ value of approximately 5%.

Figure 7:
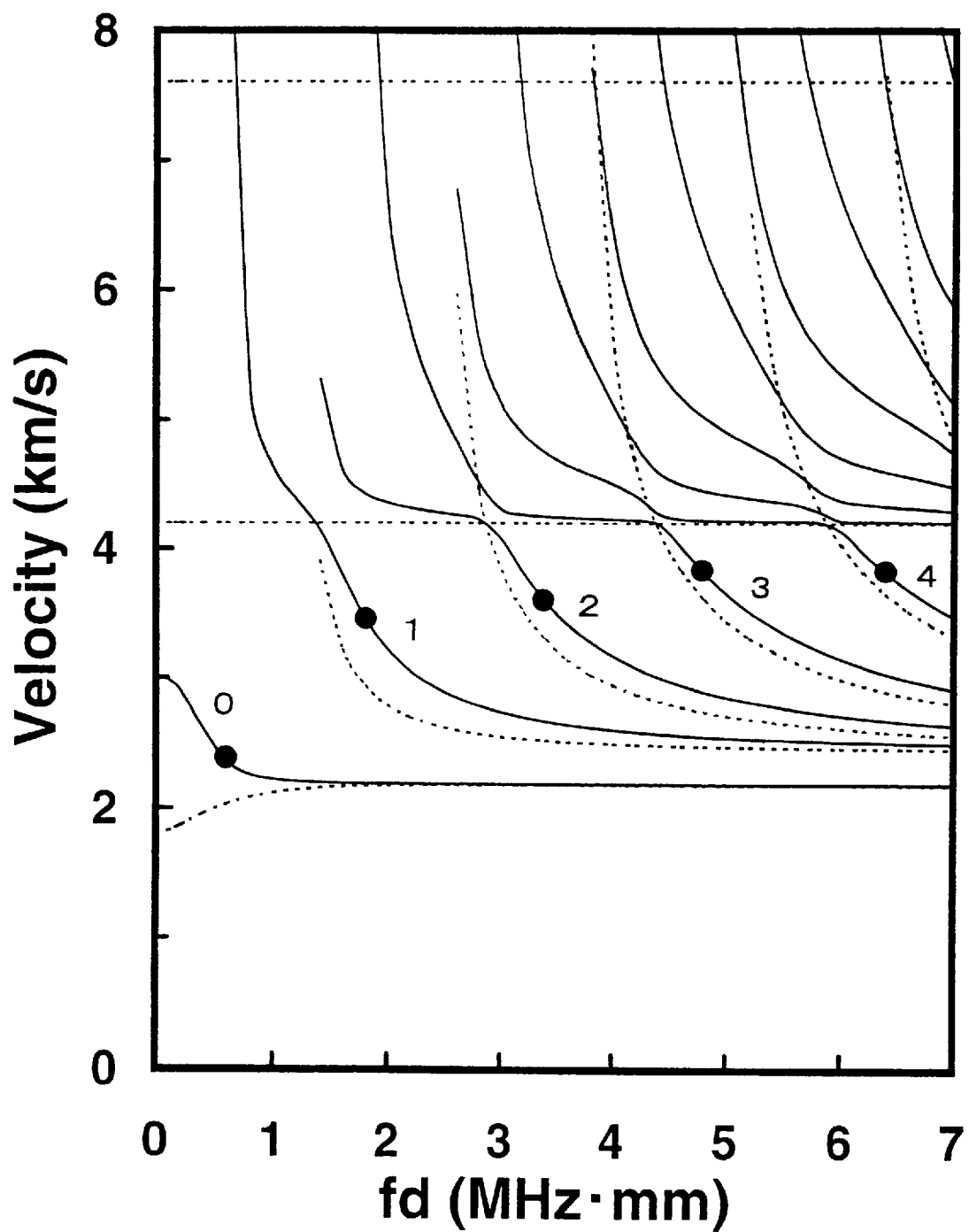
FIG. 7 shows a relationship between the phase velocity of the SH wave for each mode in each bilayer zone, and the fd value.

FIG. 7 shows a relationship between the phase velocity of the SH wave for each mode in each bilayer zone, and the fd value. In FIG. 7, nonpiezoelectric plate 1 is made from the same glass as FIG. 6. The fd value at each mark ● has the maximum $k^2$ value where an electric energy applied to each of interdigital transducers $T_0$, $T_1$, $T_2$, $T_3$ and $T_4$, is most effectively transduced to the SH wave, the maximum $k^2$ value being obtained from FIG. 6. The phase velocity at each mark ● approximates to the average velocity (3326.1 m/s) between the shear wave velocity traveling on nonpiezoelectric plate 1 alone and that traveling on each piezoelectric substrate alone. Thus, the fd value, at which the phase velocity of the SH wave excited in each of the bilayer zones $B_{T0}$, $B_{T1}$, $B_{T2}$, $B_{T3}$ and $B_{T4}$, approximates to the average value between the shear wave velocity traveling on nonpiezoelectric plate 1 alone and that traveling on each piezoelectric substrate alone, gives the maximum $k^2$ value.

Figure 8:
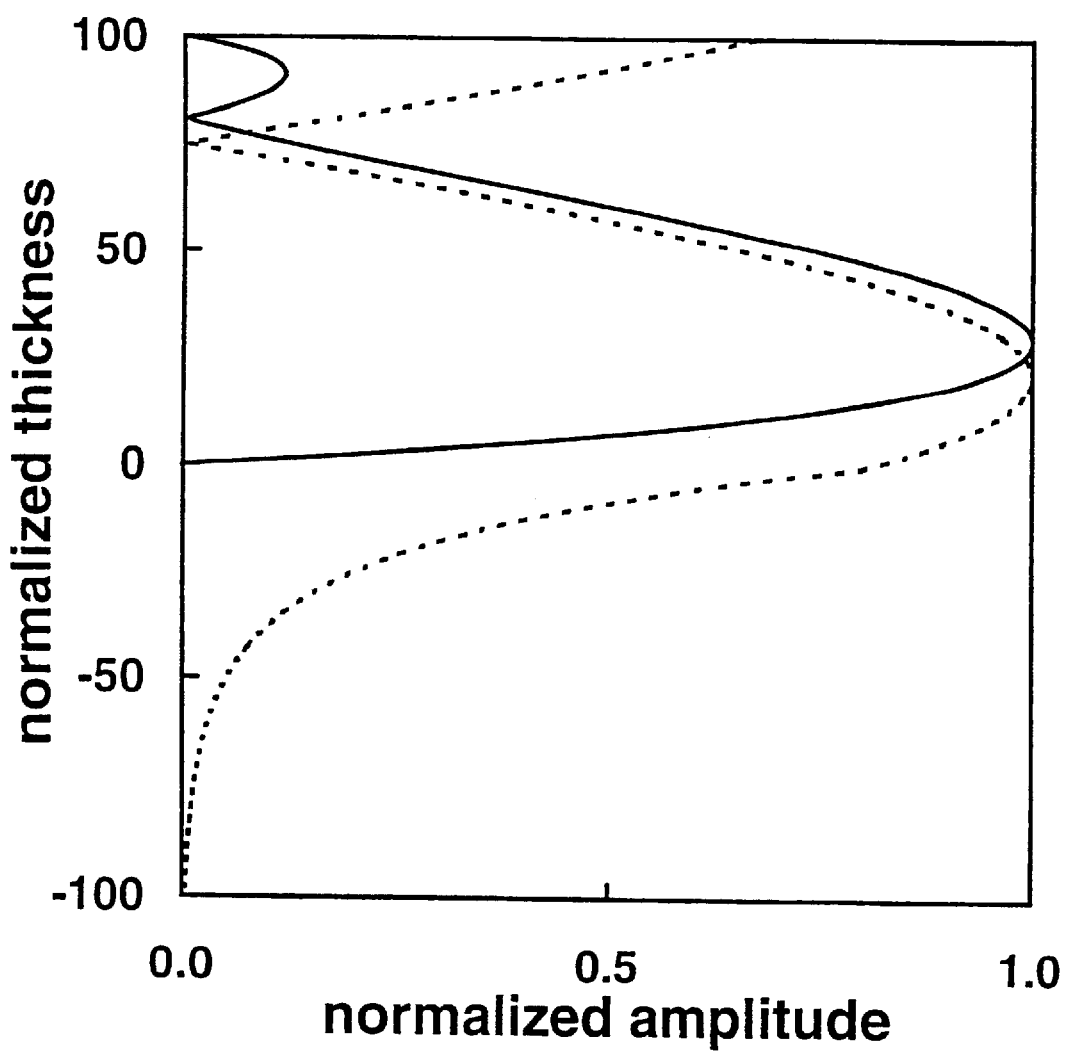
FIG. 8 shows a relationship between the thickness of each bilayer zone, and an amplitude of a displacement or an electric potential at the fd value with the approximately maximum $k^2$ value of the first mode SH wave.

FIG. 8 shows a relationship between the thickness of each bilayer zone, and an amplitude of a displacement or an electric potential at the fd value with the approximately maximum $k^2$ value of the first mode SH wave. The thickness and the amplitude are normalized by the maximum value, respectively. The thickness zero shows the boundary face between each piezoelectric substrate and nonpiezoelectric plate 1, the thickness 100 showing the boundary face between each piezoelectric substrate and air. The thickness -200 means the boundary face between nonpiezoelectric plate 1 and air, thus, the thickness -100 showing a half point from the boundary face between each piezoelectric substrate and nonpiezoelectric plate 1. A broken- and a continuous lines show the amplitude of the displacement and that of the electric potential, respectively. It is clear that the SH wave behaves like a Rayleigh wave, in other words, the SH wave is transmitted along the upper end surface of nonpiezoelectric plate 1 effectively. The behavior of the SH wave is greatly dependent on the electrically shorted condition of the boundary surface of each piezoelectric substrate to nonpiezoelectric plate 1. In addition, for the purpose of furthering the behavior of the SH wave, it is better that the thickness of nonpiezoelectric plate 1 is larger than the thickness d of each piezoelectric substrate, and that nonpiezoelectric plate 1 is made of a material such that the shear wave velocity traveling on nonpiezoelectric plate 1 alone is higher than that traveling on each piezoelectric substrate alone. Thus, it is possible to enhancing the sensitivity of the SH wave position-sensing device in FIG. 1.

Figure 9:
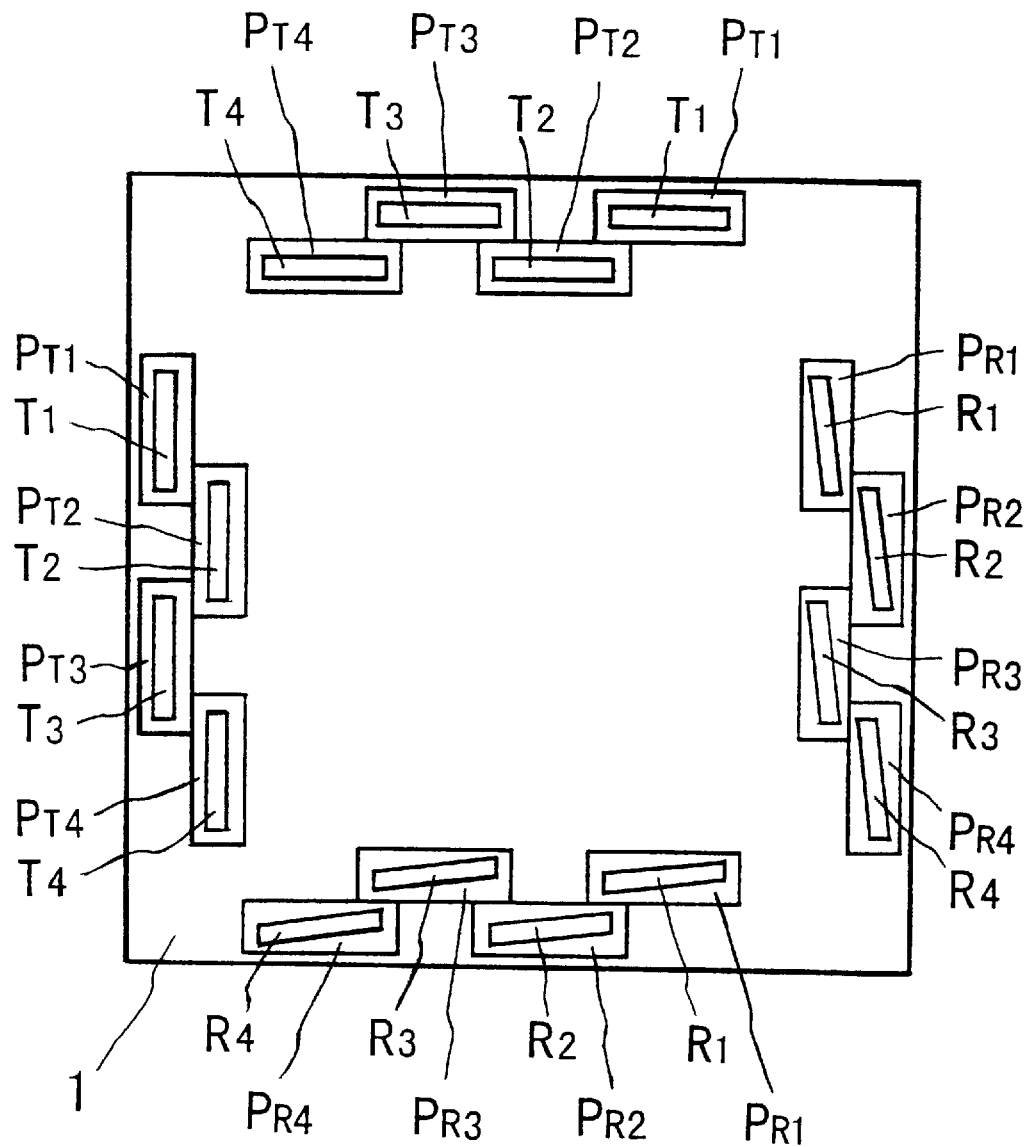
FIG. 9 shows a top plan view of an SH wave position-sensing device according to a second embodiment of the present invention.

FIG. 9 shows a top plan view of an SH wave position-sensing device according to a second embodiment of the present invention. The SH wave position-sensing device comprises nonpiezoelectric plate 1, SH wave transducing units X and Y, and signal controller 4. Each SH wave transducing unit comprises piezoelectric substrates $P_{T1}$, $P_{T2}$, $P_{T3}$, $P_{T4}$, $P_{R1}$, $P_{R2}$, $P_{R3}$ and $P_{R4}$, interdigital transducers $T_1$, $T_2$, $T_3$, $T_4$, $R_1$, $R_2$, $R_3$ and $R_4$, switch 5 and amplifier 6. FIG. 1 shows only nonpiezoelectric plate 1, all the piezoelectric substrates and all the interdigital transducers. Interdigital transducers $T_1$, $T_2$, $T_3$, $T_4$, $R_1$, $R_2$, $R_3$ and $R_4$, are cemented on the upper end surfaces of piezoelectric substrates $P_{T1}$, $P_{T2}$, $P_{T3}$, $P_{T4}$, $P_{R1}$, $P_{R2}$, $P_{R3}$ and $P_{R4}$, respectively. The lower end surfaces of all the piezoelectric substrates are cemented through an epoxy resin on the lower end surface of nonpiezoelectric plate 1. The boundary surface of each piezoelectric substrate to nonpiezoelectric plate 1 is under electrically shorted condition. The polarization axis of each piezoelectric substrate is parallel to the finger direction of interdigital transducers $T_1$, $T_2$, $T_3$ and $T_4$. Interdigital transducers $R_1$, $R_2$, $R_3$ and $R_4$, are opposed to interdigital transducers $T_1$, $T_2$, $T_3$ and $T_4$, respectively, and placed such that the finger directions thereof are slanting to those of interdigital transducers $T_1$, $T_2$, $T_3$ and $T_4$ by an angle α, respectively. An interdigital periodicity $P_N$ along the vertical direction to the finger direction of each of interdigital transducers $R_1$, $R_2$, $R_3$ and $R_4$, is equal to the product of the interdigital periodicity P and cos α. An overlap length $L_P$ along the finger direction of each of interdigital transducers $R_1$, $R_2$, $R_3$ and $R_4$, is equal to the product of the overlap length L and sec α as well as the product of N times (N=1, 2, . . . , n) the interdigital periodicity P and cosec α.

Figure 10:
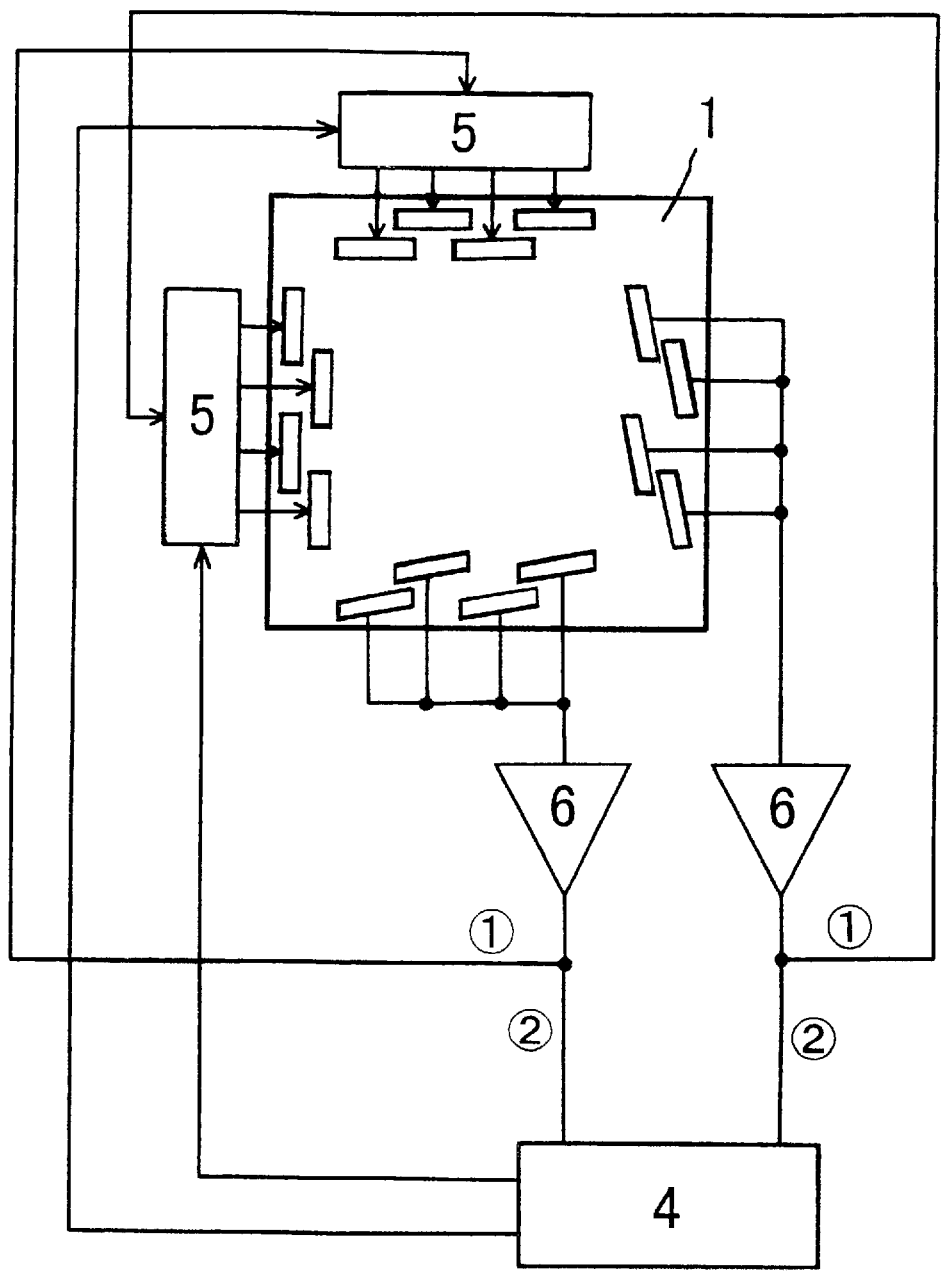
FIG. 10 shows a diagram of a driving circuit of the SH wave position-sensing device in FIG. 9.

FIG. 10 shows a diagram of a driving circuit of the SH wave position-sensing device in FIG. 9. Output terminals of interdigital transducers $R_1$, $R_2$, $R_3$ and $R_4$, are connected with each other at an output point. The output point is connected with an input terminal of signal controller 4 and that of switch 5, via amplifier 6.

In the driving circuit in FIG. 10, when an electric signal having a frequency approximately corresponding to the interdigital periodicity P is applied to interdigital transducer $T_1$, $T_2$, $T_3$ or $T_4$, via switch 5, an SH wave of the zeroth mode and the higher order modes is excited in the bilayer zone $B_{T1}$, $B_{T2}$, $B_{T3}$ or $B_{T4}$, and transmitted to the bilayer zone $B_{R1}$, $B_{R2}$, $B_{R3}$ or $B_{R4}$ through the monolayer zone between the bilayer zones $B_{T1}$ and $B_{R1}$, $B_{T2}$ and $B_{R2}$, $B_{T3}$ and $B_{R3}$, or $B_{T4}$ and $B_{R4}$, respectively, the SH wave having the wavelength approximately equal to the interdigital periodicity P. The SH wave in the bilayer zone $B_{R1}$, $B_{R2}$, $B_{R3}$ or $B_{R4}$ is transduced to electric signals $E_j$ (j=x, . . . , 2, 1, 0, -1, -2, . . . , -x) with frequencies $f_j$ (j=x, . . . , 2, 1, 0, -1, -2, . . . , -x) by interdigital transducer $R_1$, $R_2$, $R_3$ or $R_4$. The total electric signal $\Sigma E_j$ made by the electric signals $E_j$ is zero, and not able to be detected at interdigital transducers $R_1$, $R_2$, $R_3$ and $R_4$.

In the SH wave position-sensing device in FIG. 9, it is possible to sense a touch with a finger or others on one of the positions $F_j$ on the upper end surface of the monolayer zone between the bilayer zones $B_{T1}$ and $B_{R1}$, $B_{T2}$ and $B_{R2}$, $B_{T3}$ and $B_{R3}$, or $B_{T4}$ and $B_{R4}$, in the same way as in FIG. 4. The frequencies $f_j$ correspond to the positions $F_j$. If touching on the position $F_5$ corresponding to the minute propagation lane $Z_5$ of the propagation lane $D_3$, an electric signal $E_{-5}$ with a frequency $f_{-5}$ is delivered from interdigital transducer $R_3$, the electric signal $E_{-5}$ being equal to a difference between the total electric signal $\Sigma E_j$ and the electric signal $E_5$ ($E_{-5} = \Sigma E_j - E_5$). If touching nowhere, the total electric signal $\Sigma E_j$ is zero, and not able to be detected at interdigital transducers $R_1$, $R_2$, $R_3$ and $R_4$. However, according to touching on the position $F_5$, only the SH wave on the minute propagation lane $Z_5$ of the propagation lane $D_3$ is disappeared and not transduced to the electric signal $E_5$ with the frequency $f_5$. As a result, the electric signal $E_{-5}$ ($E_{-5} = \Sigma E_j - E_5$) is delivered from interdigital transducer $R_3$. The electric signal $E_{-5}$ delivered from interdigital transducer $R_3$ is applied to amplifier 6 via the output point connecting the output terminals of interdigital transducers $R_1$, $R_2$, $R_3$ and $R_4$, and then to signal controller 4 and switch 5. Signal controller 4, for the first time, clarifies that the touched position $F_5$ exists on the propagation lane $D_3$ by finding that interdigital transducer $T_3$ is supplied with the electric signal just when the electric signal $E_{-5}$ is detected at the output point connecting the output terminals of interdigital transducers $R_1$, $R_2$, $R_3$ and $R_4$. And then, signal controller 4 specifies the touched position $F_5$ out of the positions $F_j$ under evaluation of the frequency $f_{-5}$. In general, if touching on a position $F_j$ of a propagation lane $D_1$, $D_2$, $D_3$ or $D_4$, an electric signal $E_{-j}$ with a frequency $f_{-j}$ is delivered from interdigital transducer $R_1$, $R_2$, $R_3$ or $R_4$, respectively. Signal controller 4 senses a touched position $F_j$ by finding one, delivering the electric signal $E_{-j}$, of interdigital transducers $R_1$, $R_2$, $R_3$ and $R_4$, and by evaluating the frequency $f_{-j}$. Instead of finding one, delivering the electric signal $E_{-j}$, of interdigital transducers $R_1$, $R_2$, $R_3$ and $R_4$, signal controller 4 in the driving circuit in FIG. 10, finds one of interdigital transducers $T_1$, $T_2$, $T_3$ and $T_4$, the one being supplied with the electric signal just when the electric signal $E_{-j}$ is detected at the output point connecting the output terminals of interdigital transducers $R_1$, $R_2$, $R_3$ and $R_4$.

In the SH wave position-sensing device in FIG. 9, the electric signal $E_{-j}$ is delivered at one of interdigital transducers $R_1$, $R_2$, $R_3$ and $R_4$, only when touching the position $F_j$. Thus, amplifier 2 and a group of interdigital transducers $T_1$ and $R_1$, $T_2$ and $R_2$, $T_3$ and $R_3$, or $T_4$ and $R_4$, form an oscillator, causing not only a low voltage operation and low power consumption, but also a small-sized circuit with a simple structure. A touched position $F_j$ in SH wave transducing unit X and that in SH wave transducing unit Y are specified at the same time, causing a high sensitivity and a quick response time. In addition, the propagation lanes $D_1$, $D_2$, $D_3$ and $D_4$, in SH wave transducing unit X and those in SH wave transducing unit Y are vertical to each other, causing a precise specification of a touch-position. Two neighbors of the propagation lanes $D_1$, $D_2$, $D_3$ and $D_4$, in SH wave transducing unit X or Y are closed or partially overlapping each other, causing no null touch-point on all the upper- and the lower end surfaces of nonpiezoelectric plate 1.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An SH wave position-sensing device comprising:

two SH wave transducing units X and Y, each thereof consisting of
   a piezoelectric substrate $P_{T0}$,
   a piezoelectric substrate $P_{R0}$,
   piezoelectric substrates $P_{Ti}$ (i=1, 2, ..., N),
   piezoelectric substrates $P_{Ri}$ (i=1, 2, ..., N), each of said piezoelectric substrates $P_{T0}$, $P_{R0}$, $P_{Ti}$ and $P_{Ri}$, having an upper- and a lower end surfaces running perpendicular to the direction of the thickness d thereof,
   an input interdigital transducer $T_0$ formed on said upper- or said lower end surface of said piezoelectric substrate $P_{T0}$,
   an output interdigital transducer $R_0$ opposed to said interdigital transducer $T_0$ and placed on said upper- or said lower end surface of said piezoelectric substrate $P_{R0}$ such that the finger direction of said interdigital transducer $R_0$ runs parallel with that of said interdigital transducer $T_0$,
   input interdigital transducers $T_i$ (i=1, 2, ..., N) formed on said upper- or said lower end surface of said piezoelectric substrates $P_{Ti}$, respectively, the polarization axis of each of said piezoelectric substrates $P_{T0}$, $P_{R0}$, $P_{Ti}$ and $P_{Ri}$, being parallel to the finger direction of said interdigital transducers $T_0$, $R_0$ and $T_i$, said thickness d being smaller than an interdigital periodicity P of said interdigital transducers $T_0$, $R_0$ and $T_i$,
   output interdigital transducers $R_i$ (i=1, 2, ..., N) opposed to said interdigital transducers $T_i$ and placed on said upper- or said lower end surface of said piezoelectric substrates $P_{Ri}$, respectively, such that the finger direction of each interdigital transducer $R_i$ is slanting to that of each interdigital transducer $T_i$ by an angle $\alpha$, an interdigital periodicity $P_N$ along the vertical direction to the finger direction of each interdigital transducer $R_i$ being equal to the product of said interdigital periodicity P and cos $\alpha$, an overlap length $L_P$ along the finger direction of each interdigital transducer $R_i$ being equal to the product of an overlap length L of each interdigital transducer $T_i$ and sec $\alpha$ as well as the product of said interdigital periodicity P and cosec $\alpha$, an amplifier, and a phase comparator, an output terminal of said interdigital transducer $R_0$ being connected with an input terminal of said phase comparator and an input terminal of each of said interdigital transducers $T_0$ and $T_i$, via said amplifier;

a nonpiezoelectric plate having an upper- and a lower end surfaces, each piezoelectric substrate being mounted on said upper end surface of said nonpiezoelectric plate through said lower end surface of each piezoelectric substrate, the boundary surface of each piezoelectric substrate to said nonpiezoelectric plate being under electrically shorted condition; and a signal controller, an output terminal of each interdigital transducer $R_i$ being connected with an input terminal of said signal controller via said phase comparator, a part, adjacent to said piezoelectric substrate $P_{T0}$, of said nonpiezoelectric plate, and said piezoelectric substrate $P_{T0}$ forming a bilayer zone $B_{T0}$, a part, adjacent to said piezoelectric substrate $P_{R0}$, of said nonpiezoelectric plate, and said piezoelectric substrate $P_{R0}$ forming a bilayer zone $B_{R0}$, the remaining part, between said bilayer zones $B_{T0}$ and $B_{R0}$, of said nonpiezoelectric plate consisting of a monolayer zone, a part, adjacent to said piezoelectric substrate $P_{Ti}$, of said nonpiezoelectric plate, and said piezoelectric substrate $P_{Ti}$ forming a bilayer zone $B_{Ti}$ (i=1, 2, ..., N), a part, adjacent to said piezoelectric substrate $P_{Ri}$, of said nonpiezoelectric plate, and said piezoelectric substrate $P_{Ri}$ forming a bilayer zone $B_{Ri}$ (i=1, 2, ..., N), the remaining part, between said bilayer zones $B_{Ti}$ and $B_{Ri}$, of said nonpiezoelectric plate consisting of a monolayer zone, said interdigital transducer $T_0$ receiving an electric signal with a frequency approximately corresponding to said interdigital periodicity P, exciting an SH wave of the zeroth mode and the higher order modes in said bilayer zone $B_{T0}$, and transmitting said SH wave, having the wavelength approximately equal to said interdigital periodicity P, to said bilayer zone $B_{R0}$ through an upper end surface of said monolayer zone between said bilayer zones $B_{T0}$ and $B_{R0}$, said interdigital transducer $R_0$ transducing said SH wave in said bilayer zone $B_{R0}$ to an electric signal with a phase $\theta_{base}$ and delivering said electric signal, each interdigital transducer $T_i$ receiving an electric signal with a frequency approximately corresponding to said interdigital periodicity P, exciting an SH wave of the zeroth mode and the higher order modes in said bilayer zone $B_{Ti}$, and transmitting said SH wave, having the wavelength approximately equal to said interdigital periodicity P, to said bilayer zone $B_{Ri}$ through an upper end surface of said monolayer zone between said bilayer zones $B_{Ti}$ and $B_{Ri}$, the phase velocity of said SH wave approximating to the average value between the shear wave velocity traveling on said nonpiezoelectric plate alone and that traveling on each piezoelectric substrate alone, each interdigital transducer $R_i$ transducing said SH wave in said bilayer zone $B_{Ri}$ to electric signals $E_j$ (j=x, ... , 2, 1, 0, -1, -2, ... , -x) with phases $\theta_j$ (j=x, ... , 2, 1, 0, -1, -2, ... , -x), respectively, said phases $\theta_j$ corresponding to positions $F_j$ (j=x, ... , 2, 1, 0, -1, -2, ... , -x) on said upper end surface of said monolayer zone between said bilayer zones $B_{Ti}$ and $B_{Ri}$, each electric signal $E_j$ having a frequency approximately corresponding to said interdigital periodicity P, the total phase $\Sigma\theta_j$ made by said phases $\theta_j$ being zero, the total electric signal $\Sigma E_j$ made by said electric signals $E_j$ being zero and not able to be detected at each interdigital transducer $R_i$, said interdigital transducers $T_i$ and $R_i$ forming propagation lanes $D_i$ (i=1, 2, ... , N) of the SH wave on said upper end surface of said monolayer zone between said bilayer zones $B_{Ti}$ and $B_{Ri}$, each propagation lane $D_i$ consisting of minute propagation lanes $Z_j$ (j=x, ... , 2, 1, 0, -1, -2, ... , -x) corresponding to said positions $F_j$ and said phases $\theta_j$, a propagation lane $Z_0$ existing on the line not only vertical to the finger direction of each interdigital transducer $T_i$ but also dividing said overlap length L into two halves, each interdigital transducer $R_i$ delivering an electric signal $E_{-j}$ with a phase $\theta_{-j}$ only when touching with a finger or others on a position $F_j$, said phase comparator detecting a difference between said phases $\theta_{-j}$ and $\theta_{base}$, said signal controller sensing a touched position $F_j$ by finding one, delivering said electric signal $E_{-j}$, of said interdigital transducers $R_i$, and by evaluating said difference between said phases $\theta_{-j}$ and $\theta_{base}$.

2. An SH wave position-sensing device as defined in claim 1, wherein each SH wave transducing unit further comprising a switch connected with input terminals of said interdigital transducers $T_i$ and supplying said interdigital transducers $T_i$ with said electric signal with a frequency approximately corresponding to said interdigital periodicity P with a fixed period in turn, output terminals of said interdigital transducers $R_i$ being connected with each other at an output point, said signal controller sensing a touched position $F_j$ by finding one, supplied with said electric signal just when said electric signal $E_{-j}$ is detected at said output point, of said interdigital transducers $T_i$, and by evaluating said difference between said phases $\theta_{-j}$ and $\theta_{base}$.

3. An SH wave position-sensing device as defined in claim 1, wherein two neighbors of said propagation lanes $D_i$ are closed or partially overlapping each other.

4. An SH wave position-sensing device as defined in claim 1, wherein said propagation lanes $D_i$ of said SH wave transducing unit X and those of said SH wave transducing unit Y are vertical to each other.

5. An SH wave position-sensing device as defined in claim 1, wherein the thickness of said nonpiezoelectric plate is larger than said thickness d, said nonpiezoelectric plate being made of a material such that the shear wave velocity traveling on said nonpiezoelectric plate alone is higher than that traveling on each piezoelectric substrate alone.

6. An SH wave position-sensing device as defined in claim 1, wherein each piezoelectric substrate is made of a piezoelectric ceramic.

7. An SH wave position-sensing device comprising:

two SH wave transducing units X and Y, each thereof consisting of piezoelectric substrates $P_{Ti}$ (i=1, 2, ... , N), piezoelectric substrates $P_{Ri}$ (i=1, 2, ... , N), each of said piezoelectric substrates $P_{Ti}$ and $P_{Ri}$, having an upper- and a lower end surfaces running perpendicular to the direction of the thickness d thereof, input interdigital transducers $T_i$ (i=1, 2, ... , N) formed on said upper- or said lower end surface of said piezoelectric substrates $P_{Ti}$, respectively, the polarization axis of each of said piezoelectric substrates $P_{Ti}$ and $P_{Ri}$, being parallel to the finger direction of each interdigital transducers $T_i$, said thickness d being smaller than an interdigital periodicity P of each interdigital transducers $T_i$, output interdigital transducers $R_i$ (i=1, 2, ... , N) opposed to said interdigital transducers $T_i$ and placed on said upper- or said lower end surface of said piezoelectric substrates $P_{Ri}$, respectively, such that the finger direction of each interdigital transducer $R_i$ is slanting to that of each interdigital transducer $T_i$ by an angle $\alpha$, an interdigital periodicity $P_N$ along the vertical direction to the finger direction of each interdigital transducer $R_i$ being equal to the product of said interdigital periodicity P and $\cos \alpha$, an overlap length $L_P$ along the finger direction of each interdigital transducer $R_i$ being equal to the product of an overlap length L of each interdigital transducer $T_i$ and $\sec \alpha$ as well as the product of N times (N=1, 2, ... , N) said interdigital periodicity P and $\operatorname{cosec} \alpha$, and an amplifier;

a nonpiezoelectric plate having an upper- and a lower end surfaces, each piezoelectric substrate being mounted on said upper end surface of said nonpiezoelectric plate through said lower end surface of each piezoelectric substrate, the boundary surface of each piezoelectric substrate to said nonpiezoelectric plate being under electrically shorted condition; and a signal controller, output terminals of said interdigital transducers $R_i$ being connected with each other at an output point, said output point being connected with an input terminal of said signal controller and input terminals of said interdigital transducers $T_i$ via said amplifier, a part, adjacent to said piezoelectric substrate $P_{Ti}$, of said nonpiezoelectric plate, and said piezoelectric substrate $P_{Ti}$ forming a bilayer zone $B_{Ti}$ (i=1, 2, ... , N), a part, adjacent to said piezoelectric substrate $P_{Ri}$, of said nonpiezoelectric plate, and said piezoelectric substrate $P_{Ri}$ forming a bilayer zone $B_{Ri}$ (i=1, 2, ... , N), the remaining part, between said bilayer zones $B_{Ti}$ and $B_{Ri}$, of said nonpiezoelectric plate consisting of a monolayer zone, each interdigital transducer $T_i$ receiving an electric signal with a frequency approximately corresponding to said interdigital periodicity P, exciting an SH wave of the zeroth mode and the higher order modes in said bilayer zone $B_{Ti}$, and transmitting said SH wave, having the wavelength approximately equal to said interdigital periodicity P, to said bilayer zone $B_{Ri}$ through an upper end surface of said monolayer zone between said bilayer zones $B_{Ti}$ and $B_{Ri}$, the phase velocity of said SH wave approximating to the average value between the shear wave velocity traveling on said nonpiezoelectric plate alone and that traveling on each piezoelectric substrate alone, each interdigital transducer $R_i$ transducing said SH wave to electric signals $E_j$ (j=x, ..., 2, 1, 0, −1, −2, ..., −x) with frequencies $f_j$ (j=x, ..., 2, 1, 0, −1, −2, ..., −x), respectively, said frequencies $f_j$ corresponding to positions $F_j$ (j=x, ..., 2, 1, 0, −1, −2, ..., −x) on said upper end surface of said monolayer zone between said bilayer zones $B_{Ti}$ and $B_{Ri}$, the total electric signal $\Sigma E_j$ made by said electric signals $E_j$ being zero and not able to be detected at each interdigital transducer $R_i$, said interdigital transducers $T_i$ and $R_i$ forming propagation lanes $D_i$ (i=1, 2, ..., N) of the SH wave on said upper end surface of said monolayer zone between said bilayer zones $B_{Ti}$ and $B_{Ri}$, each propagation lane $D_i$ consisting of minute propagation lanes $Z_j$ (j=x, ..., 2, 1, 0, −1, −2, ..., −x) corresponding to said positions $F_j$, a propagation lane $Z_0$ existing on the line not only vertical to the finger direction of each interdigital transducer $T_i$ but also dividing said overlap length L into two halves, each interdigital transducer $R_i$ delivering an electric signal $E_{-j}$ with a frequency $f_{-j}$ only when touching with a finger or others on a position $F_j$, said signal controller sensing a touched position $F_j$ by finding one, delivering said electric signal $E_{-j}$, of said interdigital transducers $R_i$, and by evaluating said frequency $f_{-j}$.

8. An SH wave position-sensing device as defined in claim 7, wherein each SH wave transducing unit further comprising a switch connected with input terminals of said interdigital transducers $T_i$ and supplying said interdigital transducers $T_i$ with said electric signal with a frequency approximately corresponding to said interdigital periodicity P with a fixed period in turn, said signal controller sensing a touched position $F_j$ by finding one, supplied with said electric signal just when said electric signal $E_{-j}$ is detected at said output point, of said interdigital transducers $T_i$, and by evaluating said frequency $f_{-j}$.

9. An SH wave position-sensing device as defined in claim 7, wherein two neighbors of said propagation lanes $D_i$ are closed or partially overlapping each other.

10. An SH wave position-sensing device as defined in claim 7, wherein said propagation lanes $D_i$ of said SH wave transducing unit X and those of said SH wave transducing unit Y are vertical to each other.

11. An SH wave position-sensing device as defined in claim 7, wherein the thickness of said nonpiezoelectric plate is larger than said thickness d, said nonpiezoelectric plate being made of a material such that the shear wave velocity traveling on said nonpiezoelectric plate alone is higher than that traveling on each piezoelectric substrate alone.

12. An SH wave position-sensing device as defined in claim 7, wherein each piezoelectric substrate is made of a piezoelectric ceramic.

* * * * *